United States Patent [19]

Xavier et al.

[11] Patent Number: 5,481,885
[45] Date of Patent: Jan. 9, 1996

[54] VENTILATION SYSTEM FOR AN AUTOMOTIVE VEHICLE INSTRUMENT PANEL

[75] Inventors: Antonio O. Xavier, Westland; Joseph M. Huk, Jr., Southfield; Donna A. Lew, Oak Park, all of Mich.

[73] Assignee: Ford Motor Company, Dearborn, Mich.

[21] Appl. No.: 279,138

[22] Filed: Jul. 22, 1994

[51] Int. Cl.⁶ .............................. B60H 1/28; B25D 1/00
[52] U.S. Cl. ............................................ 62/259.2; 62/244
[58] Field of Search .................................. 62/259.2, 244; 454/148; 361/688

[56] References Cited

U.S. PATENT DOCUMENTS

| | | | |
|---|---|---|---|
| 3,916,639 | 11/1975 | Atkinson | 62/239 |
| 3,983,930 | 10/1976 | Franz | 165/31 |
| 4,022,599 | 5/1977 | Wilson et al. | 62/244 |
| 4,259,722 | 3/1981 | Iwata et al. | 364/424 |
| 4,520,424 | 5/1985 | Carpenter et al. | 361/383 |
| 4,616,693 | 10/1986 | Dietzsch et al. | 165/41 |
| 4,682,208 | 7/1987 | Ohashi et al. | 357/81 |
| 5,203,833 | 4/1993 | Howell | 165/41 |
| 5,220,809 | 6/1993 | Voss | 62/259.2 |
| 5,253,484 | 10/1993 | Corman et al. | 62/239 |
| 5,322,471 | 6/1994 | Bauer et al. | 454/69 |
| 5,341,652 | 8/1994 | Tajiri et al. | 62/244 |

FOREIGN PATENT DOCUMENTS

| | | | |
|---|---|---|---|
| 0110837 | 8/1980 | Japan . | |
| 6109349 | 4/1994 | Japan | 62/259.2 |

Primary Examiner—Henry A. Bennett
Assistant Examiner—William C. Doerrler
Attorney, Agent, or Firm—Mark L. Mollon; Roger L. May

[57] ABSTRACT

A ventilation system for circulating cooling air through the instrument panel of an automotive vehicle whereby electronic components within the instrument panel, such as the radio, tape deck and audio components which may include power transistors, are cooled thereby improving the durability and reliability of the electronic components, the system including portions that are common to the vehicle air conditioning and ventilation system, wherein provision is made for establishing a cooling air flow path through a circuitous air flow passage in the vehicle instrument panel to instrument panel components, including the radio chassis, which are packaged in a compact fashion in a restricted space.

4 Claims, 5 Drawing Sheets

VENTILATION SYSTEM FOR AN AUTOMOTIVE VEHICLE INSTRUMENT PANEL

TECHNICAL FIELD

The invention relates generally to instrumentation for an automotive vehicle, particularly a ventilation system for electrical components within an automotive vehicle instrument panel.

BACKGROUND OF THE INVENTION

The passenger compartment of an automotive vehicle typically includes an instrument panel that is essentially a plastic structure with air flow ducts and components with electronic elements that generate heat, such as power transistors for radios. The components in the instrument panel include, in addition to a radio or tape deck, a cluster of direct reading sensor displays, control circuitry, air conditioning and cooling vent controls, and other vehicle control components arranged in a compact assembly. The components, which are assembled with economy of space, create a heat build-up in the interior of the instrument panel. Air surrounding the components typically is prevented from circulating freely through the instrument panel.

The need for preventing an uncontrolled heat build-up in a restricted environment for electronic elements has been recognized, not only in the automotive industry but also in the aircraft industry. A cooling system for electronic components is required in order to avoid deterioration and to improve reliability.

A cooling system adapted especially for aircraft is described in U.S. Pat. No. 5,253,484. Avionic equipment in the system of the '484 patent can be cooled notwithstanding the close proximity of the avionic elements, one with respect to the other, in an aircraft pilot's compartment. The system provides air flow ducts that form a part of a cooling system using a redundant cooling air flow supply, the flow being powered by electric fans. Each cooling air source has a back-up auxiliary fan in the event of failure of the primary fan. In this way, cooling air flow for critical avionic equipment necessary for safe flight is ensured.

A typical example of a cooling system for controlling a temperature build-up for electronic control devices for an automotive vehicle is described in U.S. Pat. No. 4,616,693. Electronic components, such as power transistors, thermistors, and power resistances capable of generating significant amounts of heat can be cooled by arranging these elements on an air mixing baffle that controls the direction of flow of air from an air blower in an air conditioning system for the vehicle. The components are located on the baffle at a location where they are proximate to the exit air flow of the blower.

BRIEF DESCRIPTION OF THE INVENTION

Our invention comprises an improved plenum assembly adapted to be installed within the instrument panel of an automotive vehicle. The assembly comprises an intake air duct that receives fresh air from a fresh air inlet. An air blower powered by an electric motor in the engine compartment is adapted to transfer inlet air from an air inlet port to the upstream side of a heater core assembly. A blend door is located in the air flow path between the blower and the heater core assembly so that air can be directed either to the heater core assembly or to an air discharge port located in the vehicle engine passenger compartment. When the blend door or baffle is positioned to direct air from the blower to the heater core assembly, the air passes through the heater core and then is directed to a discharge opening in the vehicle passenger compartment. An air flow directing door or baffle controls the distribution of air to the interior of the passenger compartment or to the vehicle defroster air flow passages.

Our improved assembly includes a flexible air flow conduit that communicates with the intake air flow path at a point upstream of the heater core assembly so that air may be transferred from a cold air portion of the air conditioning vent system of the vehicle to restricted areas within the instrument panel. Cool air then is delivered to confined areas occupied by electrical and electronic heat producing components such as the automotive radio. A pressure gradient in the air flow ducts creates a natural air flow through a flexible tubing or conduit. That pressure differential, of course, is increased when the blower is operative.

If the automotive air conditioning system is operative, the outside fresh air enters the plenum assembly of the instrument panel after it passes through the evaporator of the air conditioning system. The air that passes through the flexible tubing or conduit then cools the radio chassis.

PARTICULAR DESCRIPTION OF THE INVENTION

Figure 1:
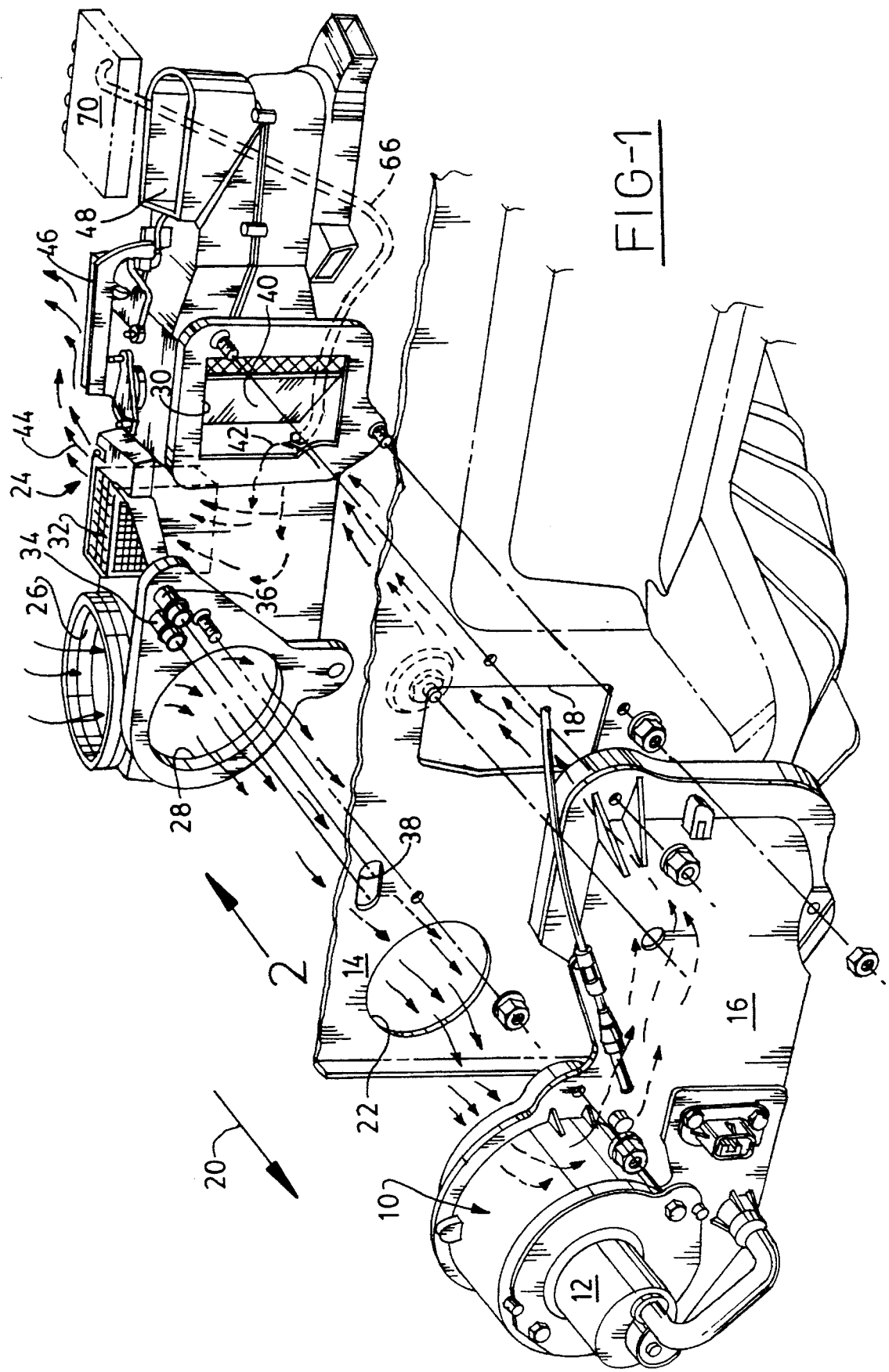
FIG. 1 is a schematic isometric view of a portion of an air delivery system situated in an instrument panel in the passenger's compartment of an automotive vehicle.
Figure 2:
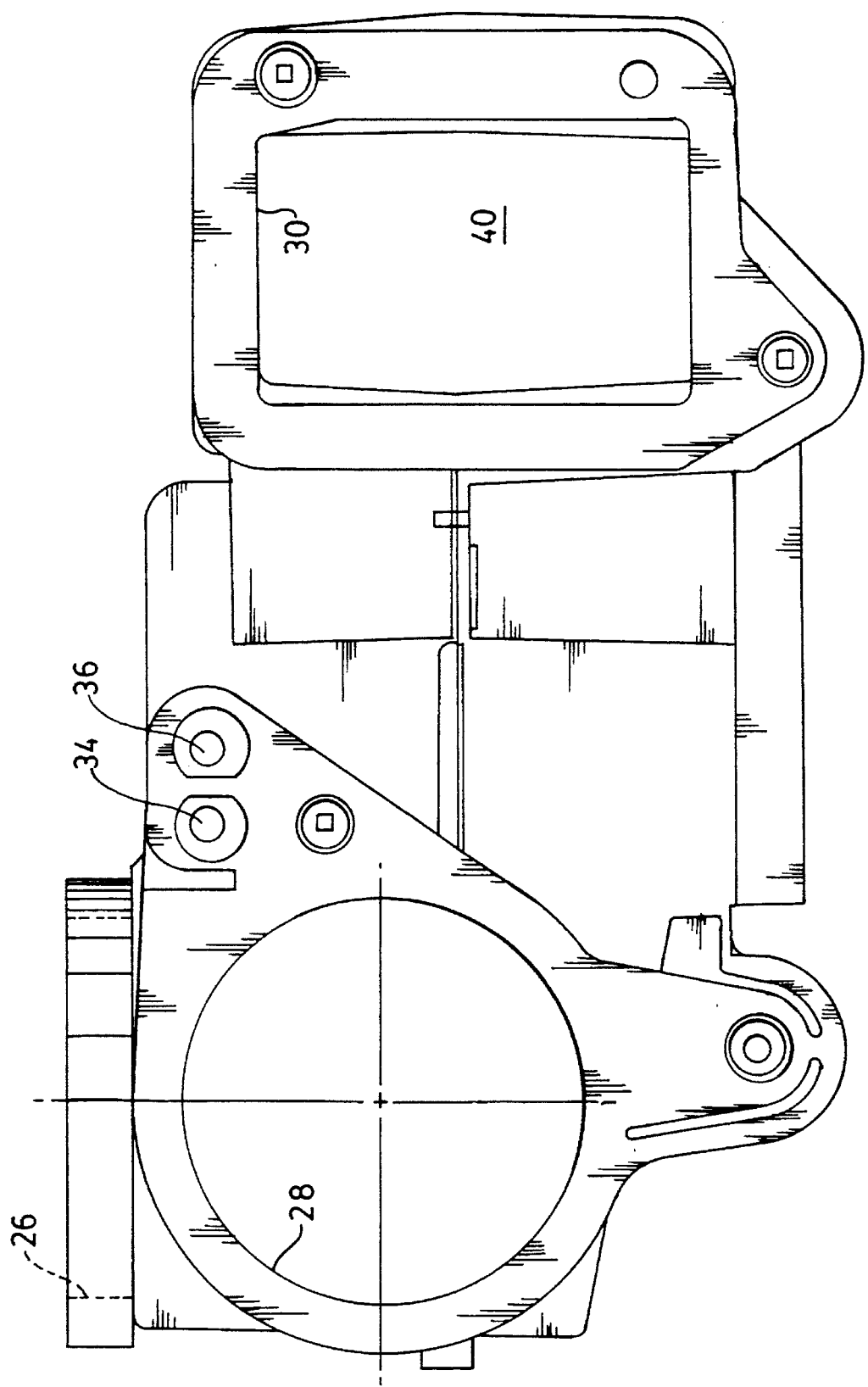
FIG. 2 is a subassembly view of a plenum assembly adapted to be located in the instrument panel of an automotive vehicle as seen from the direction of the directional arrow "2" in FIG. 1.

In FIG. 1, an air conditioning blower 10, powered by an electric motor 12, is adapted to be mounted on the fire wall 14 of an automotive vehicle. The wall 14 separates the engine compartment in the front of the vehicle from the vehicle passenger compartment. Air discharged by the blower passes through an air duct 16 and is delivered to a discharge opening 18 in the fire wall 14.

In the perspective view of FIG. 1, the front of the vehicle is indicated by the directional arrow 20.

Air enters the blower through an opening 22 formed in the fire wall 14, as seen in FIG. 1.

A plenum assembly is generally indicated in FIG. 1 by reference numeral 24. It comprises a housing, usually formed of molded plastic, which defines an air entry port 26. Air is directed by the plenum assembly toward the front of the vehicle through opening 28, which is adapted to register with opening 22 when the plenum assembly is attached by bolts to the fire wall 14.

For purposes of illustration, the blower assembly and the plenum assembly are separated from the fire wall 14. The plenum assembly includes an air intake opening 30, which is adapted to register with the opening 18 on the fire wall when the plenum assembly is bolted to the fire wall.

Located between the air entry port 26 and the opening 30 is a heater core 32. Heater core supply and return tubes, shown at 34 and 36, extend toward the front of the vehicle and through opening 38 in the fire wall 14. Coolant from the engine circulates through the heater core tubes 34 and 36 in known fashion.

Air that is transferred by the blower to the opening 30 is directed by a blend door 40 to the air intake side of the heater core 32. The direction of the air flow path is indicated by the dotted directional arrow 42.

Air passes from the outlet side of the heater core, as indicated by the air flow path designated by directional arrows 44. The heated air then is discharged through opening 46 formed in the plenum assembly. A flow directing door, not visible in FIG. 1, directs air either to the opening 46 or to a heated air flow passage 48 extending to the vehicle defroster.

Figure 6:
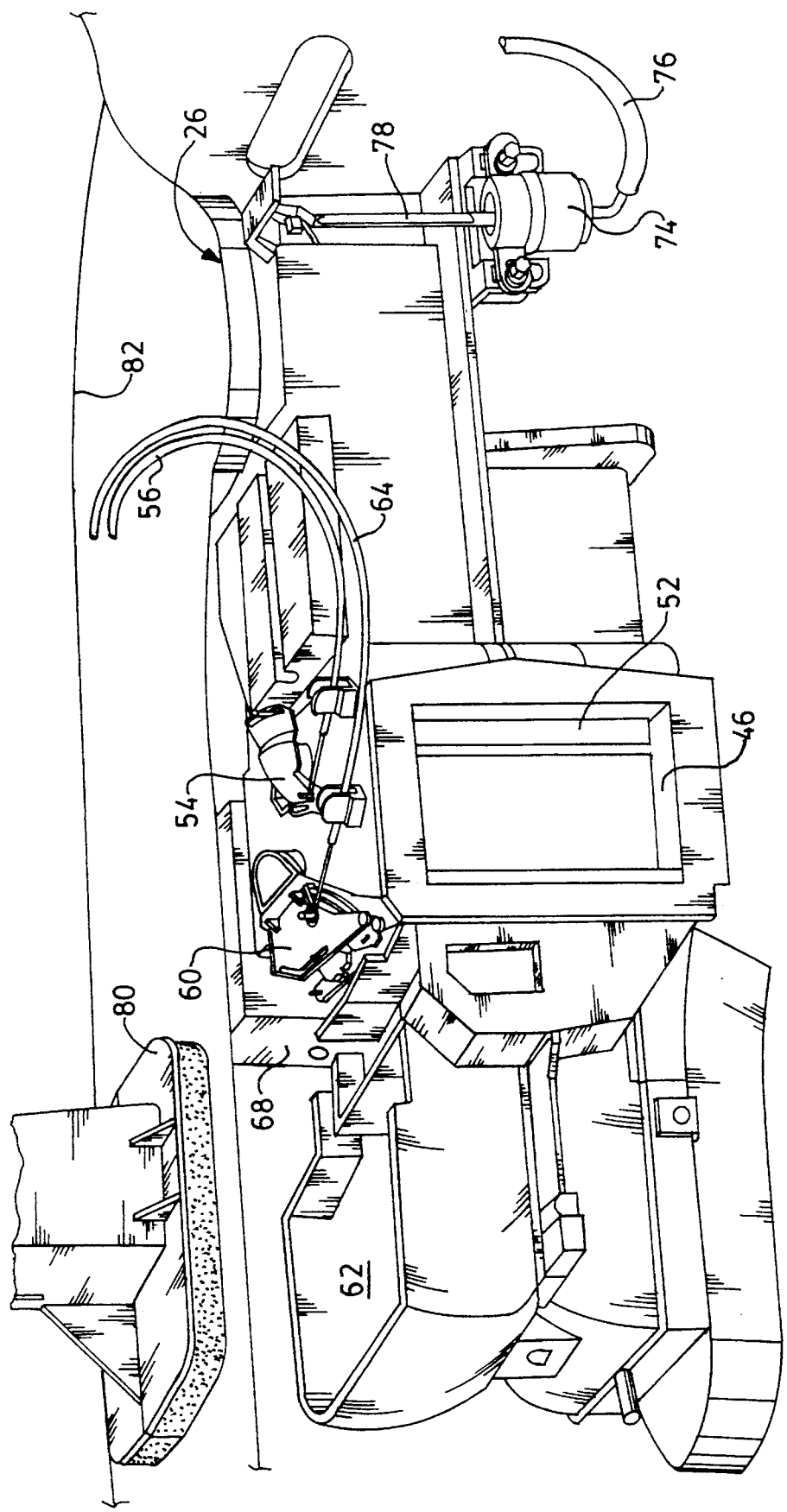
FIG. 6 is an isometric view of the plenum assembly seen in FIG. 1, although it is illustrated with a different vantage point compared to the isometric view of FIG. 1.

The opening 46 can be seen best in FIG. 6. The flow directing door that controls the passage of air through the opening 46 is indicated in FIG. 6 by reference numeral 52. The door 52 is adapted to be mounted for oscillation about a vertical axis along its inboard end. The angularity of the blend door with respect to its vertical axis is controlled by a lever assembly schematically shown at 54. The angularity of the lever assembly 54 is controlled by a cable assembly 56, which may be driven by an actuator motor or by a driver-operated lever (not shown).

Figure 5:
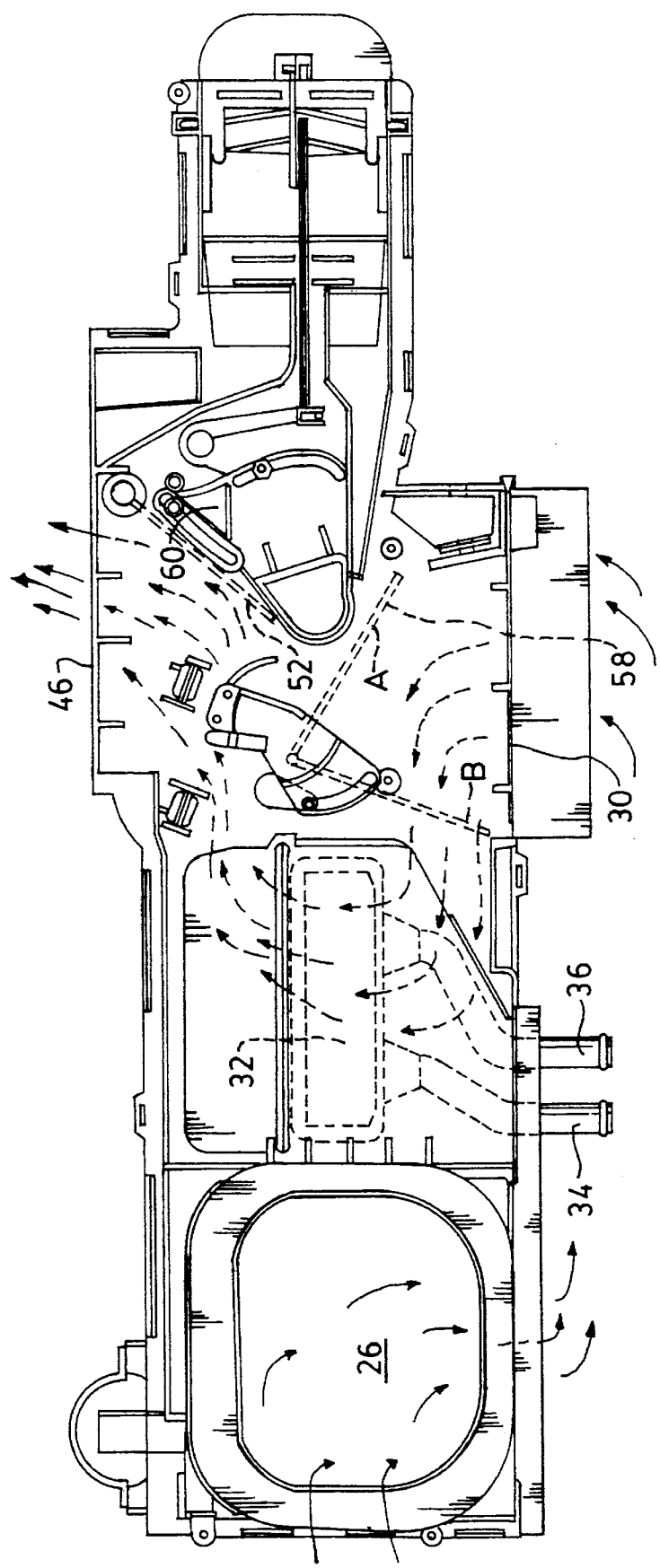
FIG. 5 is a plan view of the plenum assembly shown in FIG. 2 as seen from the top of the assembly in FIG. 2.

In FIG. 5, the position of the heater core assembly, relative to the inlet opening and the discharge opening, can be seen. The blend door for controlling the opening 30 is diagrammatically illustrated in phantom as shown at 58. When it is in position "A", as shown in FIG. 5, inlet air is directed from the opening 30 to the inlet side of the heater core 32 through internal passage structure defined by the plenum assembly. The flow path, which was indicated in FIG. 1 at 42, directs the intake air toward the right as seen in FIG. 5. When the blend door 58 is adjusted to position "B", as shown in FIG. 5, intake air flow to the inlet side of the heater core is blocked and air is directed to discharge opening 46.

The blend door that controls the opening 46 is activated by a lever assembly as shown in FIG. 6 at 60. The defroster duct can be seen in FIG. 6 at 62. It is in communication with the air flow stream through the opening 30 when the blend door 52 interrupts flow through the discharge opening 46. Lever assembly 60 is actuated by a cable assembly 64. Like the cable assembly 56, the cable assembly 64 can be actuated by a control motor or by a driver-operated lever.

The flexible tube or conduit that conducts cooling air through the plenum assembly to the radio chassis is shown in FIG. 1 at 66. It is secured to an opening formed in the plenum wall 68 seen in FIG. 6. The flexible tube is adapted to be entrained through the restricted interior of the instrument panel assembly of the vehicle. Its output end is positioned, as shown schematically in FIG. 1, at the top of radio/tape deck/tape cassette chassis 70. Thus, cooling air from the blower passes through the flow path illustrated schematically at 42 in FIG. 1 and enters the inlet of the flexible conduit 66 at a point upstream from the heater core 32. Cooling air flows through the flexible conduit regardless of the position of door 48.

Figure 3:
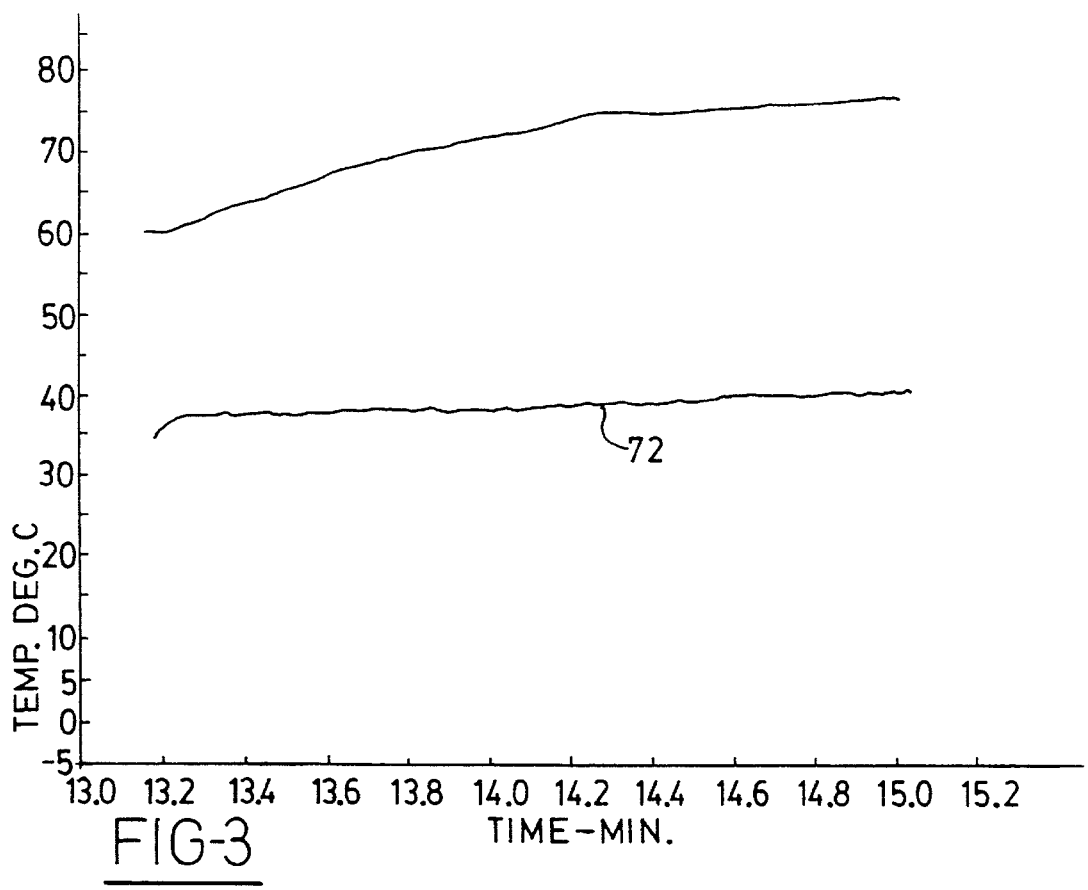
FIG. 3 is a time plot of the temperature within the portion of the instrument panel of an automotive vehicle that is occupied by a radio and tape deck when the vehicle does not include the improvements of our invention.

FIG. 3 shows the relationship between temperature rise in the vicinity of the radio and tape deck for a typical installation. Degrees Celsius is indicated on the ordinate and time in minutes is indicated on the abscissa. At a time of 15 minutes following initial operation, the temperature rises, as seen in FIG. 3, to about 75° C. In contrast, the passenger compartment temperature, as indicated at 72, remains relatively constant at approximately 40° C.

Figure 4:
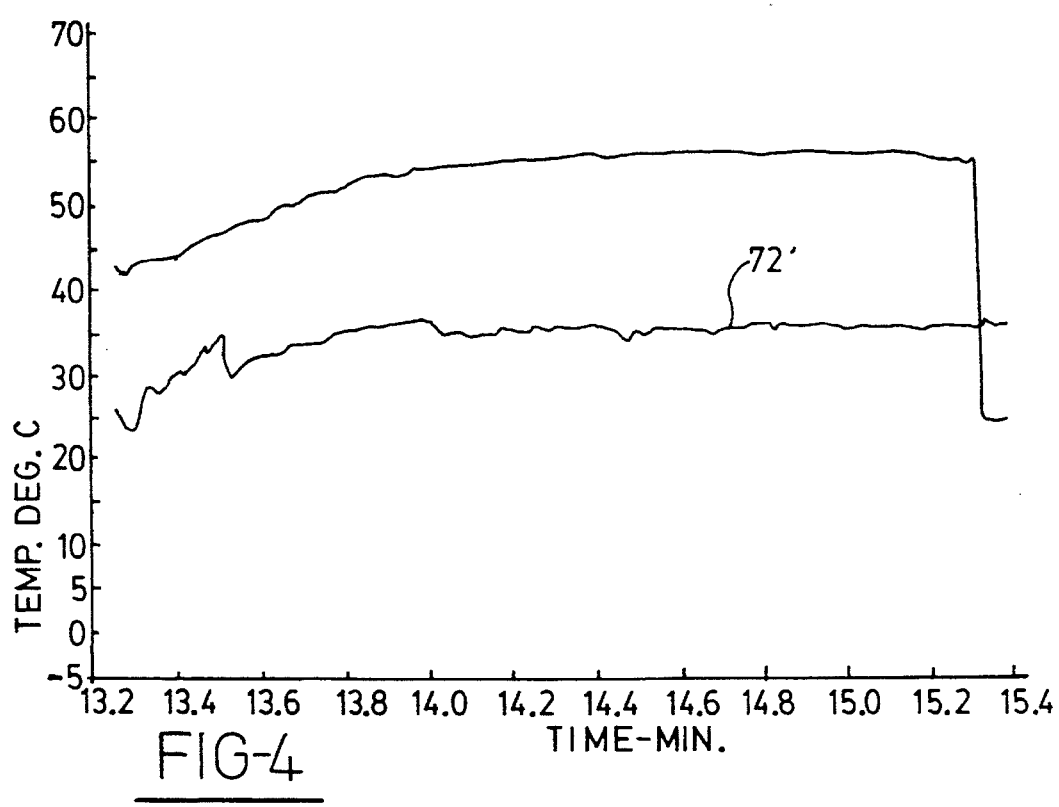
FIG. 4 is a plot of the temperature versus time for an installation that contains the improvements of our invention.

After the instrument panel assembly has been modified to incorporate the improvements of our invention, the temperature versus time characteristic curve, which is indicated in FIG. 4, shows a temperature drop to a maximum value of about 56° C. at an operating time of 15 minutes. This is in contrast to a temperature of about 37° C. in the passenger compartment, as indicated at 72' in FIG. 4.

FIG. 6 shows a vacuum servo motor 74, which has a vacuum pressure line 76 and an actuator rod 78 connected to a lever assembly for an air flow directing door for the air inlet 26. FIG. 6 also shows a cover assembly 80 for the defroster duct 62, which extends generally vertically, to conduct heated air to the vehicle windshield. Intake air enters the intake air duct 26 through openings formed in the vehicle cowl assembly at the base of the glass windshield. The lower margin of the windshield is schematically illustrated in FIG. 6 at 82.

We have found that the flexible conduit 66 is capable of transferring cool air from the upstream air flow region of the heater core if it has a diameter of about ⅝ to ¾ inch. It may be formed of a variety of commercially available plastic materials and it can be routed through the restricted interior of the instrument panel assembly without crimping.

If desired, provision may be made for connecting the interior of the plenum assembly to a negative pressure region through a vacuum pressure conduit. The vacuum pressure conduit can be connected to the air conditioning vent system at a point that is subjected to a pressure lower than ambient pressure. This has the potential of improving ventilation inside the entire instrument panel as well as concentrating cooling at specific locations, such as at the location of the radio chassis. Installation testing shows that temperatures of a radio chassis have been lowered from a temperature range of about 170° F. to 180° F. to about 140° F. even without the presence of a low pressure conduit for ventilating the entire interior of the instrument panel assembly.

It will be apparent to persons skilled in the automotive art that modifications to the embodiment we have disclosed may be made without departing from the scope of our invention.

Having described a preferred embodiment of our invention what we claim and desire to secure by U.S. Letters Patent is:

We claim:

1. A cooling air plenum assembly for an automotive vehicle instrument panel containing electrical components, said plenum assembly comprising a housing, a fresh air inlet port in said housing;

a heater core in said plenum assembly, coolant flow conduits communicating with said heater core;

an air discharge port in said plenum assembly, an air duct defined by said plenum assembly and adapted to conduct fresh air to an upstream side of said heater core; and a flexible air conduit communicating with said air duct and extending through said instrument panel to at least one of said electrical components whereby the operating temperature of said component is reduced.

2. An automotive vehicle instrument panel adapted to be mounted in a passenger compartment of an automotive vehicle having a forward engine compartment, a fire wall separating said engine compartment from said passenger compartment;

an air blower mounted in said engine compartment on said fire wall, an air intake opening and an air discharge opening in said fire wall communicating, respectively, with a low pressure air intake portion and a high pressure air discharge portion for said blower;

said instrument panel including an air plenum assembly, electrical components in said instrument panel including a radio;

a heater core assembly in said plenum assembly;

an air discharge port and an air inlet port in said plenum assembly, an air delivery duct defined by said plenum assembly and adapted to conduct fresh air from said air inlet port to the upstream side of said heater core; and a flexible air conduit communicating with said air delivery duct upstream of said heater core and extending through said instrument panel to said radio whereby the operating temperature of said radio is moderated.

3. The combination as set forth in claim 1 wherein said plenum assembly includes a blend door movably mounted in said air delivery duct and adapted to direct intake air in said air delivery duct to the upstream side of said heater core when it assumes one position and to bypass air around said heater core when it assumes a second position.

4. The combination as set forth in claim 2 wherein said plenum assembly includes a blend door movably mounted in said air delivery duct and adapted to direct intake air in said air delivery duct to the upstream side of said heater core when it assumes one position and to bypass air around said heater core when it assumes a second position.

* * * * *